United States Patent
Schay

(10) Patent No.: US 9,424,273 B2
(45) Date of Patent: Aug. 23, 2016

(54) SYSTEM AND METHOD FOR ASYNCHRONOUS USE OF A NETWORK-BASED FILE SYSTEM

(71) Applicant: NetApp, Inc., Sunnyvale, CA (US)

(72) Inventor: Peter Schay, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 485 days.

(21) Appl. No.: 13/875,186

(22) Filed: May 1, 2013

(65) Prior Publication Data

US 2014/0330778 A1 Nov. 6, 2014

(51) Int. Cl.
*G06F 17/30* (2006.01)

(52) U.S. Cl.
CPC .................. *G06F 17/30203* (2013.01)

(58) Field of Classification Search
None
See application file for complete search history.

(56) References Cited

U.S. PATENT DOCUMENTS 7,865,475 B1 * 1/2011 Yadav ............. G06F 11/2069 707/655
2006/0271697 A1 * 11/2006 Kruse ............. H04L 29/08072 709/230
2011/0040810 A1 * 2/2011 Kaplan et al. .............. 707/822
2012/0017209 A1 * 1/2012 Ben-Yehuda et al. ........ 718/1

OTHER PUBLICATIONS

JSON-RPC 2.0 Specifcation, Author: JSON-RPC Working Group, Mar. 26, 2010.*
Thurlow, "RPC: Remote Procedure Call Protocol Specification Version 2," RCP 5531, May 2009.*
Shepler et al., "Network File System (NFS) version 4 Protocol," RFC 3530, Apr. 2003.*
JSON-RPC 2.0 Batch Discussion, Google Groups, Oct. 2009.*

* cited by examiner

*Primary Examiner* — Jay Morrison
(74) *Attorney, Agent, or Firm* — Nixon Peabody LLP; Khaled Shami

(57) ABSTRACT

A system and method for utilizing a network-based file system from a client terminal. In examples described herein, an input command is processed on a client terminal for use of the network-based file system. A task is initiated in response to the input command. The performance of the task includes concatenating multiple file system operations associated with the input command and communicating the multiple file system operations to the network-based file system as a single communication. One or more replies to the one or more file system operations are asynchronously processed.

19 Claims, 4 Drawing Sheets

SYSTEM AND METHOD FOR ASYNCHRONOUS USE OF A NETWORK-BASED FILE SYSTEM

TECHNICAL FIELD

Examples described herein relate to a system and method for asynchronous use of a network-based file system.

BACKGROUND

Network-based file systems include distributed file systems which use network protocols to regulate access to data. Network File System (NFS) protocol is one example of a protocol for regulating access to data stored with a network-based file system. The specification for the NFS protocol has had numerous iterations, with recent versions NFS version 3 (1995) (See e.g., RFC 1813) and version 4 (2000) (See e.g., RFC 3010). In general terms, the NFS protocol allows a user on a client terminal to access files over a network in a manner similar to how local files are accessed. The NFS protocol uses the Open Network Computing Remote Procedure Call (ONC RPC) to implement various file access operations over a network.

Other examples of remote file access protocols for use with network-based file systems include the Server Message Block (SMB), Apple Filing Protocol (AFP), and NetWare Core Protocol (NCP). Generally, such protocols support synchronous message-based communications amongst programmatic components.

DETAILED DESCRIPTION

Figure 1:
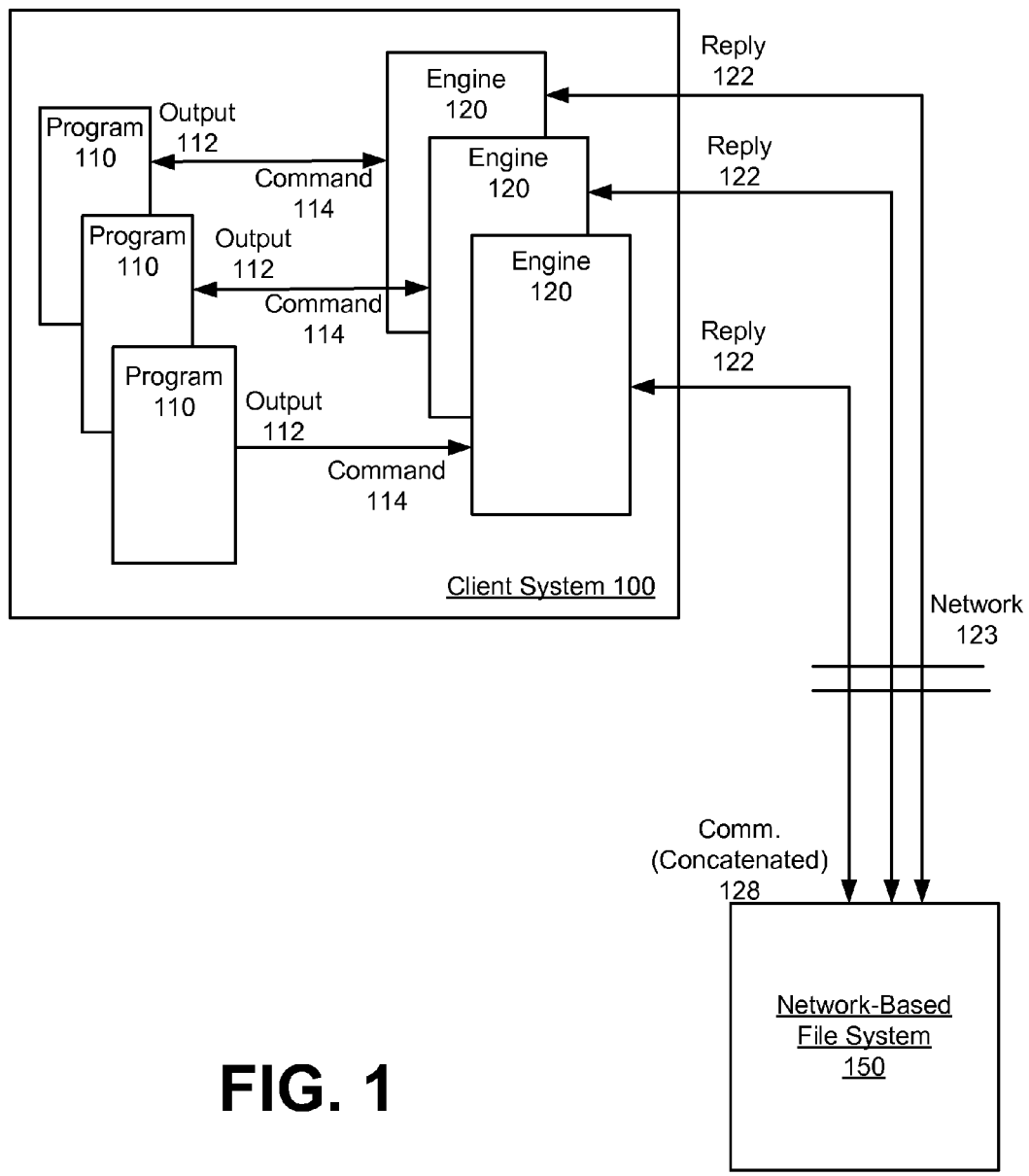
FIG. 1 illustrates a system for utilizing a network-based file system from a client terminal, according to an embodiment.

Examples described herein relate to a client system that is able to asynchronously access a network-based file system by generating concatenated or batched requests for performance of file system operations by the network-based file system. Among other benefits, examples described herein recognize that significant inefficiency is introduced under current protocols in which file system operations are individually recognized and synchronously handled. In contrast to conventional approaches, examples described herein communicate file system operations in concatenated form (e.g., akin to streaming data). Moreover, the file system operations are implemented asynchronously, thereby realizing greater efficiency and significantly mitigating the effects of network latency.

According to some examples, a system and method is provided in which an input command is processed on a client terminal for use of the network-based file system. A task is initiated in response to the input command. The performance of the task includes concatenating multiple file system operations associated with the input command and communicating the multiple file system operations to the network-based file system as a single request. One or more responses to the single request are processed asynchronously based on the one or more file system operations.

Still further, some examples described herein include a computer system for utilizing a network-based file system. The computer system includes a memory resource, one or more processors, and a network interface. The one or more processors use instructions from the memory resource to provide an engine that is responsive to at least a designated command for use of the network-based file system. The engine initiates at least a first task in response to the designated command, by (i) concatenating multiple file system operations associated with the input command and communicating the multiple file system operations to the network-based file system as a single request; (ii) asynchronously processing one more responses to the single request based on the one or more file system operations; and (iii) detecting one or more events in performing the first task from which one or more new tasks are to be initiated. The engine may also include a scheduler, which operates to (i) selectively enable one or more of the first task and/or new tasks to be performed in parallel; (ii) queue one or more of the responses to the single request; and (iii) pair each response from the network-based file system to one of the first task and/or new task(s) which specified a file system operation for which the response was provided.

Among other benefits, examples described herein achieve a technical effect in which programs and operations that require access to resources of a network-based file system are performed significantly faster than more conventional approaches. For example, programs can asynchronously issue file system operation requests from the network-based file systems in order to implement programs such as copying directories. In turn, these programs can complete their objectives at a speed that is based on efficient utilization of the network's maximum transmission unit (MTU) and maximum bandwidth. Accordingly, examples such as described enable certain programs that require use of network-based file systems to complete their objectives in a fraction of the time as compared to more conventional approaches that rely on synchronous, message-based communications as between the client terminal and the network-based file systems.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a sub-routine, a portion of a program, or a software component or a hardware component capable of performing one or more stated tasks or functions. As used herein, a module or component can exist in a hardware component independently of other modules/components or a module/component can be a shared element or process of other modules/components, programs or machines. A module or component may reside on one machine, such as on a client or on a server, or may alternatively be distributed among multiple machines, such as on multiple clients or server machines. Any system described may be implemented in whole or in part on a server, or as part of a network service. Alternatively, a system such as described herein may be implemented on a local computer or terminal, in whole or in part. In either case, implementation of a system may use memory, processors and network resources (including data ports and signal lines (optical, electrical etc.)), unless stated otherwise.

Furthermore, one or more embodiments described herein may be implemented through the use of instructions that are executable by one or more processors. These instructions may be carried on a non-transitory computer-readable medium. Machines shown in figures below provide examples of processing resources and non-transitory computer-readable mediums on which instructions for implementing one or more embodiments can be executed and/or carried. For example, a machine shown for one or more embodiments includes processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and tablets) and magnetic memory. Computers, terminals, and network-enabled devices (e.g. portable devices such as cell phones) are all examples of machines and devices that use processors, memory, and instructions stored on computer-readable mediums.

System Overview

FIG. 1 illustrates a system for utilizing a network-based file system from a client terminal, according to an embodiment. A client system 100 such as described by an example of FIG. 1 can be implemented on a workstation or other client terminal that is coupled to and/or serving as part of a network-based file system. A network-based file system such as described by various examples herein can correspond to a distributed file system that is provided in a networked environment, under a protocol such as NFS Version 3 or Version 4.

In FIG. 1, a system 100 includes a client system 100 and a network-based file system 150. The network-based file system 150 can be implemented by a combination of computers, including one or more servers that handle requests from one or more client terminals. For the purpose of simplicity, only one client system 100 is shown. However, client system 100 can be representative of other client systems that use the same network-based file system 150. Additionally, in some variations, the network-based file system 150 can also be implemented in part by one or more client systems 100. Thus, for example, the client system 100 can also include a role in which it serves files for access by other computers. The client system 100 can access the files and resources of the network-based file system 150 using a network protocol such as NFS Version 3 or Version 4. A network 123 can connect the client system 100 with one or more servers of the network-based file system 150. In communicating over the network 123, client system 100 can utilize a Transmission Control Protocol/Internet Protocol (TCP/IP)-Ethernet protocol.

According to examples described herein, client system 100 can include one or more programs 110 for implementing any one of multiple possible file system operations using file stored on the network-based file system 150. The programs 110 can be implemented through an operating system, such as a LINUX or MAC based (e.g., MAC OS, manufactured by APPLE INC.) operating system. Each program 110 can be provided in engine 120 which operates to generate calls or requests, such as Remote Procedure Calls ("RPC") corresponding to a file system operation. In the context of NFS, examples of file system operations include read/write, remove file, look up a name in a directory, set attributes (e.g., "setattr"), create file, get attributes (e.g., "getattr"), move/rename file and read sequences of entries in a directory (e.g., "readdirplus"). Such file system operations are only examples, and different file system operations can be implemented for different protocols.

In an embodiment, each program 110 can issue a command 114 to initiate logic associated with that program 110. Each program 110 can also be associated with a corresponding engine 120. Each engine 120 includes task logic to implement the functionality of the corresponding program in a manner that maximizes throughput of the network in terms of communicating file system operations. In one implementation, each engine 120 can be specific to a particular program 110, and each program 110 can initiate multiple engines 120. A given engine 120 can be initiated by the command of the corresponding program 110. As shown by FIG. 1, multiple engines 120 can operate at one time, to leverage parallelism and the computational capability of the client terminal 100.

Once initiated, each engine 120 opens multiple TCP/IP channels with one or more servers of the network-based file system 150. Each engine 120 initiates one or more tasks that output multiple file system operations (e.g., RPC-type communications, corresponding to NFS requests, ETC.). The engine 120 can concatenate the multiple file system operations outputted from tasks into individually framed communications 128. Thus, for example, each communication 128 can specify multiple file system operations. In the context of NFS Version 3, for example, each of the multiple file system operations specified in any one communication 128 can correspond to an RPC. Each communication 128 can be framed, for example, as an Ethernet packet, where each Ethernet packet includes an Ethernet frame, additional headers (e.g., IP headers) and multiple RPC-type communications. The RPC-type communications of the communication 128 can form a TCP stream. The limit as to the number of RPC-type communications that can be included in a single Ethernet packet are based on the maximum transmission unit (MTU) of the network. Thus, an example of FIG. 1 provides for multiple concatenated file system operations (e.g., RPC calls) which are communicated as a batched set of file system operations, using a single framed communication 128.

In contrast to conventional approaches which communicate file system operations as individual messages, the engine(s) 120 can communicate multiple file system operations of different kinds at one time. The engine 120 can also receive replies to the various file system operations in batch. Additionally, the engines 120 include logic to asynchronously handle replies to the various requested file system operations. As descried with an example of FIG. 2, the asynchronous logic of each engine 120 can include task logic that (i) yields operations in anticipation of a response; (ii) generates additional tasks as needed, each of which generate sets of file system operations for concatenated communication to the network-based file system 150; and (iii) handles replies to the various file system operations specified with individual requests 128. The asynchronous logic can also include functionality to time or otherwise schedule the performance of select tasks within each engine 120, so that tasks are, queued, or performed in parallel or in series as needed.

Figure 2:
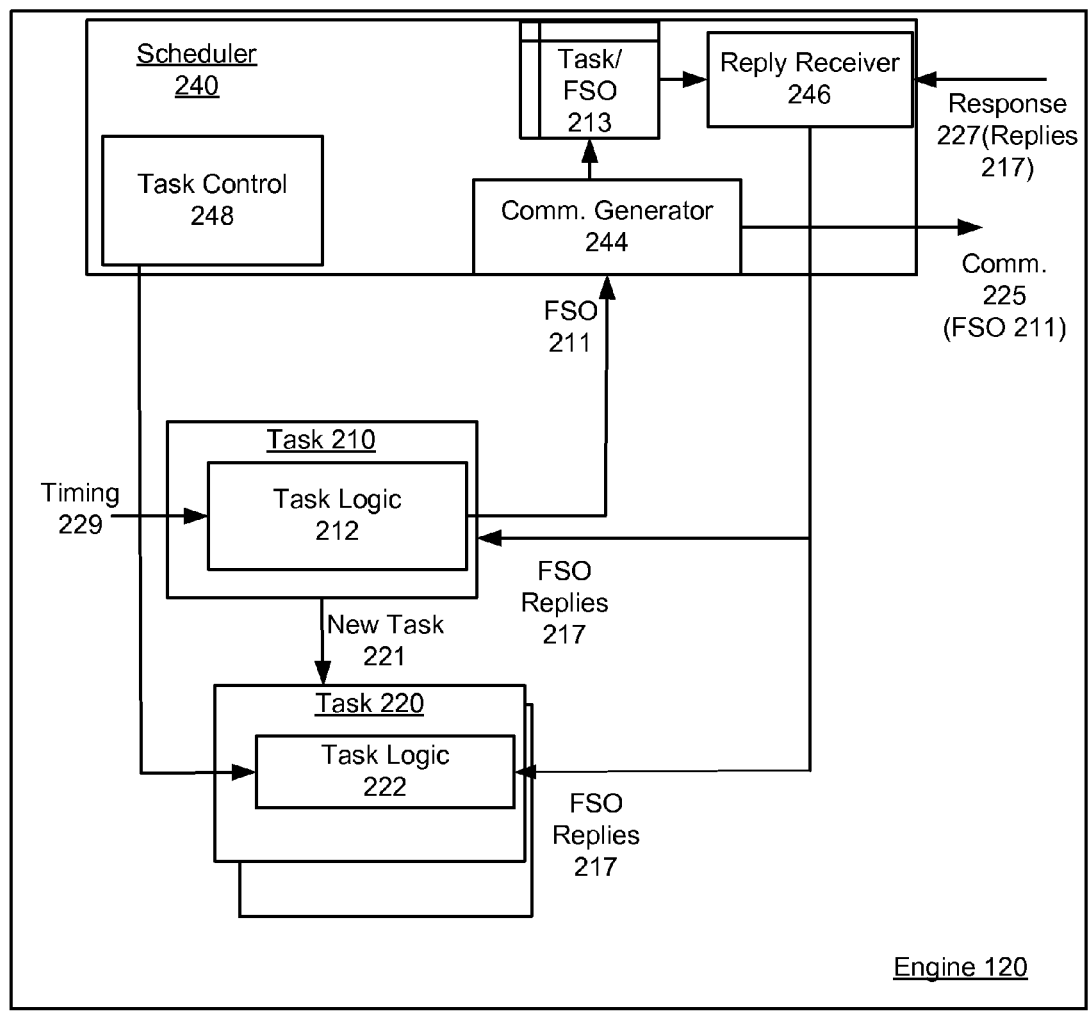
FIG. 2 illustrates an example engine implemented on a client system, according to an embodiment.

FIG. 2 illustrates an example engine implemented on a client system, according to an embodiment. As mentioned with an example of FIG. 1, the engine 120 can be associated with a program that runs on the client system 100 to access and utilize the network-based file system 150. With reference to an example of FIG. 2, the engine 120 can include a scheduler 240 that initiates one or more tasks 210, 220. Each task 210, 220 can correspond to a coroutine or process that structures one or more sequences of operations. The tasks 210, 220 can be initiated in response to the command input from the program running on the client system. Each task 210, 220 includes task logic that can be implemented to generate file system operations 211, generate new tasks in response to events or conditions, process replies 217 to the file system operations, and yield as needed to manage replies 217 in context of the generated file system operations 211.

In an example of FIG. 2, the task logic 212 of the task 210 generates the task 220. Each task logic 212, 222 includes coroutines that are implemented in accordance with predefined instructions. The task logic 212 can respond to input as well as to data returned by responses from the network-based file system 150. In implementing the coroutines, the task logic 212 can specify multiple file system operations 211. The file system operations 211 can be communicated by the scheduler 240 (or other programmatic component) to the network-based file system 150. Based on respective task logic 212, 222, each task 210, 220 can continue its coroutines independent of pending replies 217 to generated file system operations 211. If, however, the task logic 212, 222 dictates that the task 210, 220 needs the response 227 to a particular file system operation before continuing, then the particular task 210, 220 may yield until the reply is received.

The scheduler 240 can include a communication generator 244, a reply receiver 246, and a task control element 248. Each task 210, 220 can communicate its file system operations 211 to the communication generator 244 as output. The communication generator 244 communicates the file system operations 211 specified by the individual tasks 210, 220 by including a stream or batch of requests (e.g., RPCs) with individual communications that are communicated across the network 123 to the network-based file system 150. In one implementation, the communication generator 244 concatenates a batch of file system operations 211 generated from one or more tasks 210, 220 into a single framed communication 225. For example, the communication 225 can be structured under the Ethernet protocol, and carry multiple RPC-type communications (e.g., NFS Version 3) that correspond to individual file system operations 211 generated from one or more of the tasks 210, 220. For example, the communication 225 can be structured or framed as an individual Ethernet protocol message. The communication generator 244 communicates the individual communication 225 to the network-based file system 150, where each file system operation specified in the message is acted upon. Each file system operation 211 that is communicated with one of the communications 225 can be tracked by a data structure (task/FSO 213) that identifies the corresponding task, so that the reply can be paired to the appropriate task 210, 200.

Each file system operation 211 may generate a corresponding reply 217 from the network-based file system. The scheduler 240 can pair the replies 217 to the particular task 210, 220 that generated the corresponding file system operation 211. The reply receiver 246 can process replies to the various file system operations 211 that are communicated through individual communications 225. In one implementation, the reply receiver 246 can receive one or more responses 227 that carry replies 217 to the various file system operations 211 specified in one or more prior requests 225. The responses 227 can thus correspond to a framed network communication (e.g., structured as an Ethernet protocol communication) that includes replies 217 to the file system operations 211. The replies 217 can, for example, be communicated as a stream or otherwise in some concatenated form, similar to the structure of the communication 225. In one implementation, a server on the network-based file system 150 includes functionality such as described with engine 120 in order to generate concatenated responses to various file system operations specified in the individual communication 225. The reply receiver 246 can use identification information included in the replies 217 to pair each reply (e.g., via data structure 213) with a corresponding task 210, 220 (if more than one task is in operation).

According to examples described herein, each task 210, 220 and scheduler 240 operate to process the file system operations 211 generated by the individual tasks 210, 220 in asynchronous fashion. The task logic 212, 222 of each task 210, 220 continues to generate additional file system operations 211 for additional communications 225 (e.g., messages) to the network-based file system 150, independent of receiving replies 217 to the issued file system operations. In performing its operations, the task logic 212, 222 may also yield when, for example, subsequent operations are dependent on the response from the network-based file system 150. The scheduler 240 manages each running or yielding task 210, 220. In variations, one or more of the tasks 210, 220 can run as a separate process to leverage parallelism (e.g., processing resources). In such an implementation, the parallel operating tasks 210, 220 can run as part of separate engines, and each can initiate additional tasks within their respective engine.

In contrast to examples such as described with FIG. 1 and FIG. 2, under conventional approaches, the multiple file system operations 211 would typically be handled synchronously. For example, a programmatic component that generates an RPC-type communication (corresponding to a file system operation 211) would yield pending a reply to that communication. The synchronous nature of the communication would cause the component that issued the RPC-type communication to be delayed in its subsequent operations. Examples of FIG. 1 and FIG. 2, on the other hand, generate RPC-type communications (e.g., NFS requests) and asynchronously handle the replies for such communications, thereby eliminating much inefficiency by the synchronous nature of the conventional message-based approach.

Additionally, examples provide that the task logic 212 is able to generate new tasks (or sub-tasks) 220 as needed. In some implementations, the task logic 212 may implement programmatic triggers that create new tasks when certain events or conditions occur. For example, the programmatic triggers can include events or conditions included in the reply from the network-based file system 150. When such events or conditions are detected, the task logic 212 generates one or more new tasks (or sub-tasks) 222. Such tasks 220 can be implemented in a manner that is similar to the originating task 210. Thus, for example, each new task 220 can be implemented with task logic 222. The task logic 222 of the new tasks 220 can also generate multiple file system operations 211. The scheduler 240 can receive batches of file system operations 211 from any number of currently running tasks. In one implementation, each task 210, 220 continues to generate file system operations 211 which are received in batch by the scheduler 240 until the task yields or pauses (e.g., scheduler 240 signals task to yield). Thus, a single message (e.g., communication 225) can include a batch of file system operations 211 communicated from multiple running tasks 210, 220. The file system operations 211 can be concatenated within the communication 225 to form, for example, a TCP stream. Each communication 225 can be structured as a TCP/IP-Ethernet protocol message for the network-based file system 150.

The scheduler 240 can implement task control 248 to schedule tasks 210, 220, including to control when tasks 210, 220 are performed in relation to one another. If, for example, the tasks 210, 220 are independent, then the scheduler 240 can signal timing control 229 to the tasks 210, 220 to cause the tasks to be performed in parallel. If, however, the completion of one task 210 is dependent on completion of another task 220, then the scheduler 240 may signal timing control 229 to the task 210 so that the task completes upon completion of the other task 220. For example, one task 210, 220 can yield, pause of delay pending completion of another task. As an addition or alternative, the scheduler 240 can also include logic to determine, when, for example, the use of multiple tasks at one time exceeds a limit of the network file system 150 or client system 100. In such instances, the scheduler can pause one or more tasks 210, 220 when they yield.

Methodology

Figure 3:
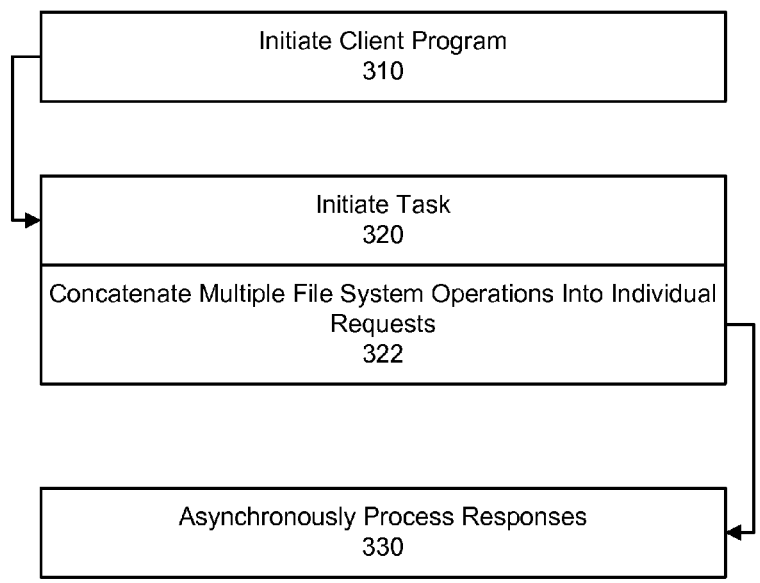
FIG. 3 illustrates a method for utilizing a network-based file system from a client terminal, according to an embodiment.

FIG. 3 illustrates a method for utilizing a network-based file system from a client terminal, according to an embodiment. A method such as described by an example of FIG. 3 can be implemented using components such as described with a example system of FIG. 1 and/or an example engine of FIG. 2. Accordingly, reference may be made to elements of FIG. 1 or FIG. 2 for purpose of illustrating suitable elements or components for performing a step or sub-step being described.

With reference to FIG. 3, a client program is initiated (310). For example, client system 100 may initiate a program for accessing files from the network-based file system 150. The program may be initiated by a user command input, such as one provided by an administrator. According to some examples, the client program is linked or otherwise associated with an engine that can (i) schedule the running of tasks which output file system operations (e.g., RPC communications corresponding to NFS requests), (ii) generate single Ethernet packets that carry multiple file system operations (e.g., up to MTU) for the network-based file system 150, and (iii) receive responses that individually carry multiple replies to the various file system operations outputted by the tasks.

In more detail, an engine 120 can be initiated in response to a command or input from a program running on the client system 100. Multiple engines 120 can be initiated at one time, either for the same or different task. Additionally, each engine 120 can run one or multiple tasks (320). When the task is performed, multiple file system operations can be concatenated into individual Ethernet packets that are communicated to the network-based file system over a TCP/IP connection (322). For example, the engine 120 can run tasks 210, 220 that output multiple file system operations as RPC type communications (e.g., NFS requests). The RPC-type communications may be concatenated within the Ethernet packet of the communication 225, so that the individual RPC-type communications are streamed at one time from the client terminal 100 to the network-based file system 150.

The task 210 can process responses to the individual RPC type communications asynchronously (330). As an asynchronous operation, the task 210 continues to perform its logic as needed without awaiting further replies to issued file system operations from the network-based file system 150. Among other benefits, the asynchronous manner in which the responses to the file system operations are processed eliminates performance issues that would otherwise arise with synchronous handling of such communications.

Figure 4:
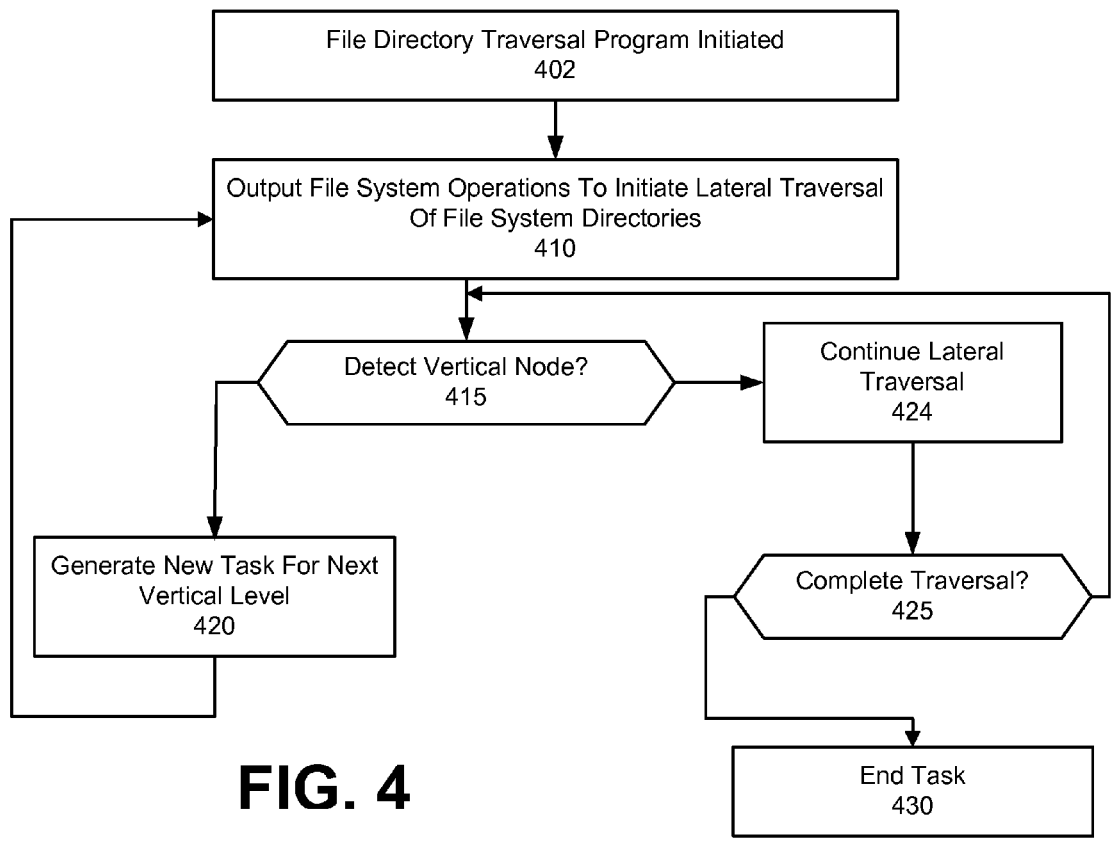
FIG. 4 illustrates an example of a program for traversing a file directory provided through a network-based file system, according to an embodiment.

FIG. 4 illustrates an example of a program for traversing a file directory provided through a network-based file system, according to an embodiment. As with an example of FIG. 3, a method such as described with FIG. 4 can be implemented using components such as described with FIG. 1 or FIG. 2. Accordingly, reference may be made to elements of FIG. 1 or FIG. 2 for purpose of illustrating suitable elements or components for performing a step or sub-step being described.

With reference to FIG. 4, a program is initiated on a client terminal to traverse a file directory (402). By way of example, a file directory can be traversed when a program reads or copies a directory from one location to another. As described with other examples, the program can be associated with engine 120. The program can be operated to initiate the engine 120, which in turn runs tasks for purpose of completing the objective of the program.

When the tasks are initiated, the tasks generate as output multiple file system operations (410). According to some examples, the file system operations correspond to NFS type requests for access to information about the network-based file system 150 (e.g., "readdirplus" under NFS Version 3). The file system operations can request that the network-based file system traverse a specific directory in accordance with algorithmic considerations that are implemented through the engine 120.

In one implementation, the engine 120 makes a determination as to whether replies received from the file system operations issued by a given task indicate whether a vertical node has been detected in the specified directory (415). If a vertical node is detected in (415), the engine 120 generates a new task for purpose of laterally traversing the directory at a next vertical level accessed through the detected vertical node (420). The newly generated task may run concurrently with the given task, so that each task runs in parallel for different vertical levels of the specified directory. Each task may generate its own set of file system operations for purpose of reading, copying, or otherwise processing (e.g. checksumming) the specified file in a directory at a particular vertical level.

If no vertical node is detected, the given task continues its lateral traversal (424). Thus, for example, the given task may continue to issue file system operations. A determination may be made as to whether the given task completed its lateral traversal of the file directory at the particular level (425). The determination may be based in part on the replies received to the file system operations issued by the particular task that is assigned to the level of the specified file directory.

If the determination is that the given task did in fact complete its lateral traversal, then the task ends (430). At this time it is possible for other task to be in operation (e.g., issuing file system operations for communication to the network-based file system 150) for other levels of the file directory. If, however, the determination is that the given task has not completed its traversal, then the method is repeated at (415) (e.g., a determination is made as to whether vertical node has been detected, based on the replies received to the file system operations requested).

Computer System

Figure 5:
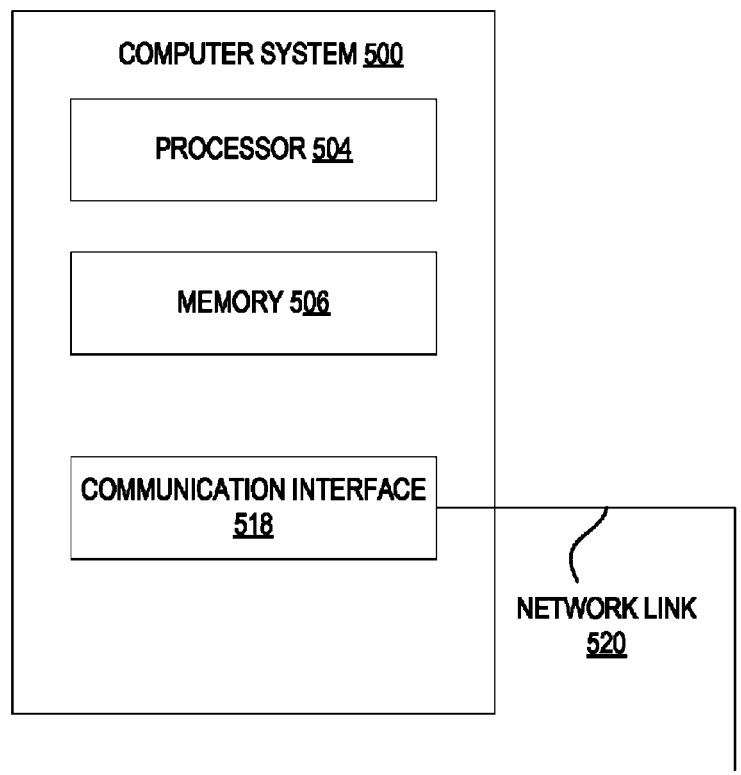
FIG. 5 is a block diagram that illustrates a computer system in which embodiments described herein may be implemented.

FIG. 5 is a block diagram that illustrates a computer system upon which embodiments described herein may be implemented. For example, in the context of FIG. 1, system 100 may be implemented using one or more computer systems such as described by FIG. 5. Likewise, engine 120 as described by FIG. 2 can be implemented using an example computer system of FIG. 5. Still further, methods such as described with FIG. 3 and FIG. 4 can be implemented using a computer such as described with an example of FIG. 5.

In an embodiment, computer system 500 includes processor 504, memory 506 (including non-transitory memory), storage device 510, and communication interface 518. Computer system 500 includes at least one processor 504 for processing information. Computer system 500 also includes a main memory 506, such as a random access memory (RAM) or other dynamic storage device, for storing information and instructions to be executed by processor 504. Main memory 506 also may be used for storing temporary variables or other intermediate information during execution of instructions to be executed by processor 504. Computer system 500 may also include a read only memory (ROM) or other static storage device for storing static information and instructions for processor 504. A storage device 510, such as a magnetic disk or optical disk, is provided for storing information and instructions. The communication interface 518 may enable the computer system 500 to communicate with one or more networks through use of the network link 520 (wireless or wireline).

In one implementation, memory 506 may store instructions for implementing functionality such as described with an example of FIG. 1, or implemented through an example method such as described with FIG. 2. Likewise, the processor 504 may execute the instructions in providing functionality as described with FIG. 1, or performing operations as described with an example method of FIG. 2.

Embodiments described herein are related to the use of computer system 500 for implementing the techniques described herein. According to one embodiment, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for utilizing a network-based file system from a client terminal, the method being implemented by one or more processors and comprising:
processing an input command on the client terminal for use of the network-based file system;
in response to the input command, initiating one or more tasks for accessing files from the network-based file system, each task of the one or more tasks, including multiple file system operations;
concatenating the multiple file system operations from each task of the one or more tasks and communicating the multiple file system operations from each task of the one or more tasks to the network-based file system as a single communication; and
asynchronously executing the one or more tasks by:
continuing to generate additional file system operations for the one or more tasks independent of receiving replies to the multiple file system operations from the network-based file system, and
receiving and performing operations on one or more replies from the network-based file system, the one or more replies responsive to the multiple file system operations, while continuing to generate the additional file system operations for the one or more tasks.

2. The method of claim 1, wherein concatenating multiple file system operations includes structuring the multiple file system operations into a stream contained within a single Ethernet Protocol message.

3. The method of claim 1, further comprising performing the one or more tasks, including initiating one or more sub-tasks, and concatenating the additional file system operations from the one or more tasks, and the one or more subtasks, and communicating the additional file system operations in one or more communications.

4. The method of claim 3, further comprising receiving multiple responses from the network-based file system, and pairing each of the multiple responses to one of the one or more tasks or sub-tasks.

5. The method of claim 3, wherein performing the one or more tasks includes yielding to await for a response from the network-based file system.

6. The method of claim 3, further comprising selectively performing two or more of the tasks and/or sub-tasks in parallel when no dependencies exist as between the two or more of the tasks and/or sub-tasks.

7. The method of claim 3, further comprising selectively sequencing performance of two or more of the tasks and/or sub-tasks when one or more dependencies exist as between the two or more of the tasks and/or sub-tasks.

8. The method of claim 2, wherein each of the multiple file system operations are each communicated as a remote procedure call to the network-based file system.

9. The method of claim 2, wherein each of the multiple file system operations corresponds to a network file system operation.

10. The method of claim 1, further comprising performing the one or more tasks, including (i) concatenating multiple file system operations to initiate lateral traversal of a directory of the network-based file system at a first level, (ii) detecting a vertical node to a next level of the directory; (iii) generating a sub-task to laterally traverse the next level of the directory, including concatenating multiple file system operations to laterally traverse the next level of the directory; and (iv) repeating (ii) and (iii) until each vertical node of the directory is detected.

11. The method of claim 10, wherein performing the one or more tasks is in response to a read directory command.

12. A computer system for utilizing a network-based file system, the computer system comprising:
a memory resource;
one or more processors;
a network interface;

wherein the one or more processors use instructions from the memory resource to provide:
an engine that is responsive to at least a designated command for use of the network-based file system, the engine initiating at least a first task in response to the designated command for accessing files from the network-based file system, by (i) concatenating multiple file system operations associated with the input command and communicating the multiple file system operations to the network-based file system as a single communication; (ii) asynchronously processing one or more responses to the single communication by: continuing to generate additional file system operations for the first task independent of receiving replies to the multiple file system operations from the network-based file system, and receiving and performing operations on one or more replies responsive to the multiple file system operations while continuing to generate the additional concatenated file system operations associated with the input command; and (iii) detecting one or more events in performance of the first task from which one or more new tasks are to be initiated;
a scheduler to (i) selectively enable one or more of the first task and/or new tasks to be performed in parallel; (ii) queue one or more of the responses to the single communication; and (iii) pair each response from the network-based file system to one of the first task and/or new task which specified a file system operation for which that response was provided.

13. The system of claim 12, wherein the engine generates multiple communications, each communication specifying multiple concatenated file system operations from at least one of the first task and/or one or more of the new tasks.

14. The system of claim 12, wherein the one or more processors implement multiple engines in parallel, including separate engines for different commands.

15. The system of claim 12, wherein the one or more processors concatenate the multiple file system operations by communicating the multiple file system operations as one Ethernet Protocol communication.

16. The system of claim 12, wherein each of the multiple file system operations are each communicated as a remote procedure call to the network-based file system.

17. The system of claim 12, wherein each of the multiple file system operations corresponds to a network file system operation.

18. The system of claim 12, wherein the engine performs the first task by (i) concatenating multiple file system operations to laterally traverse a directory of the network-based file system at a first level, (ii) detecting a vertical node to a next level of the directory; (iii) generating a sub-task to laterally traverse the next level of the directory, including concatenating multiple file system operations to laterally traverse the next level of the directory; and (iv) repeating (ii) and (iii) until each vertical node of the directory is detected.

19. A computer-readable medium that stores instructions for utilizing a network-based file system from a client terminal, the computer-readable medium including instructions that, when executed by one or more processors, cause the one or more processors to perform operations that include:
processing an input command on the client terminal for use of the network-based file system;
in response to the input command, initiating one or more tasks for accessing files from the network-based file system, each task of the one or more tasks, including multiple file system operations;
concatenating the multiple file system operations from each task of the one or more tasks and communicating the multiple file system operations from each task of the one or more tasks to the network-based file system as a single communication; and
asynchronously executing the one or more tasks by:
continuing to generate additional file system operations for the one or more tasks independent of receiving replies to the multiple file system operations from the network-based file system, and
receiving and performing operations on one or more replies from the network-based file system, the one or more replies responsive to the multiple file system operations, while continuing to generate the additional file system operations for the one or more tasks.

* * * * *